(12) United States Patent
Eschler et al.

(10) Patent No.: US 7,222,999 B2
(45) Date of Patent: May 29, 2007

(54) HEADLIGHT FOR VEHICLES

(75) Inventors: Johannes Eschler, Ditzingen (DE); Markus Hauk, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 180 days.

(21) Appl. No.: 10/523,446

(22) PCT Filed: Oct. 13, 2003

(86) PCT No.: PCT/DE03/03390

§ 371 (c)(1),
(2), (4) Date: Jan. 31, 2005

(87) PCT Pub. No.: WO2004/069592

PCT Pub. Date: Aug. 19, 2004

(65) Prior Publication Data

US 2005/0248954 A1    Nov. 10, 2005

(30) Foreign Application Priority Data

Jan. 20, 2003   (DE) ................ 103 01 830

(51) Int. Cl.
*F21V 11/00* (2006.01)
(52) U.S. Cl. ................ 362/510; 362/539; 362/293
(58) Field of Classification Search ................ 362/293, 362/510, 538, 539
See application file for complete search history.

(56) References Cited

U.S. PATENT DOCUMENTS

| | | | | |
|---|---|---|---|---|
| 6,644,840 B2 * | 11/2003 | Yagi et al. | ................ | 362/510 |
| 6,827,473 B2 * | 12/2004 | Kobayashi | ................ | 362/510 |
| 2001/0019482 A1 | 9/2001 | Kobayashi et al. | | |
| 2003/0007363 A1 | 1/2003 | Yagi | | |

FOREIGN PATENT DOCUMENTS

| | | |
|---|---|---|
| DE | 40 32 927 A1 | 4/1992 |
| EP | 0 936 107 A1 | 8/1999 |
| EP | 1 191 279 A2 | 3/2002 |
| FR | 2 800 152 | 4/2001 |
| FR | 2800152 | 4/2001 |
| JP | 2001060403 | 3/2001 |

OTHER PUBLICATIONS

Patent Asbtract of Japan 2000348513 A, 12, 15, 2000.

* cited by examiner

*Primary Examiner*—Stephen F Husar
(74) *Attorney, Agent, or Firm*—Michael J. Striker

(57) ABSTRACT

In a headlight for vehicles that emits light in the near-infrared range and that has both a light source, which projects not only in the infrared range but also in the visible range, and an infrared range-transmissive filter, a transition range of the filter extends from the infrared range into the red spectral range of the visible range, and further spectral components in the visible range are emitted in attenuated form.

7 Claims, 1 Drawing Sheet

HEADLIGHT FOR VEHICLES

CROSS-REFERENCE

The invention described and claimed hereinbelow is also described in PCT/DE 03/03390, filed on Oct. 13, 2003 and DE 103 01 830.1, filed on Jan. 20, 2003. This German Patent Application, whose subject matter is incorporated here by reference, provides the basis for a claim of priority of invention under 35 U.S.C. 119 (a)–(d).

BACKGROUND OF THE INVENTION

The invention relates to a headlight for vehicles that emits light in the near-infrared range and that has both a light source, which projects not only in the infrared range but also in the visible range, and an infrared range-transmissive filter.

From German Patent DE 40 32 927 C2, for improving night vision, it is known to illuminate the space ahead of the vehicle with infrared radiation and to capture the thus-illuminated region with a camera. For this purpose, the near-infrared range is used, since suitable image sensors for it are available. However, the light sources used for the purpose have a radiation maximum in the near-infrared range.

In the known headlights, filtering which prevents visible light from being emitted is therefore provided for the illumination in the near-infrared range vehicle that give a red impression must be avoided, which as a rule is also regulated by law, through relevant regulations.

The object of the present invention is to propose a headlight for emitting radiation in the near-infrared range that utilizes the sensitivity of image sensors as well as possible and does not produce a red color impression.

SUMMARY OF THE INVENTION

This object is attained according to the invention in that a transition range of the filter extends from the infrared range into the red spectral range of the visible range; and that further spectral components in the visible range are emitted in attenuated form.

The headlight of the invention has the advantage that the intensity of the infrared range, in the particular spectral range in which the image sensor is still relatively highly sensitive, is largely unattenuated by the filter, and that nevertheless, the headlights do not produce a red color impression. Filters that do not have extremely steep edges and that are therefore not correspondingly expensive can be used. Interference filters are preferably suitable.

The embodiments of the invention in detail and their refinements depend, among other factors, on the extent to which the filter admits visible light in the red spectral range, and on what demands are made in terms of the color and radiation output of the total visible light admitted. In an advantageous embodiment of the invention, it is therefore provided that the further spectral components and the red component admitted by the filter produce a color impression which is not red.

Another advantageous refinement of the invention is that the filter is transmissive for the further spectral components.

With this refinement, although the red component cannot be compensated for, nevertheless the further spectral components can predominate, in such a way that the radiation admitted by the filter, of between 700 μm and 780 μm, is not perceived as red by the human eye. This refinement can be designed such that the further spectral components and the red component include the visible range. It is preferably provided that the transmission of the filter is greater in the short-wave range of the further spectral components than in their long-wave range.

To illuminate a distant light region with the aid of infrared radiation, so-called projection headlights, in which as in a projector a parabolic mirror and a lens are provided as an objective, are particularly suitable. In one embodiment of such a headlight, known from Japanese Patent Disclosure JP-2000348513 A, the filter is provided between the parabolic mirror and the lens. There, however, because of the wide opening angle of the beam path, various transmission angles occur, which causes the filter characteristic curve to shift into the peripheral regions of the beam path, rather than the middle.

To avoid this disadvantage, in another refinement of the headlight of the invention, it is provided that the filter is located in front of the headlight. At that point, the peripheral and middle rays of the entire beam are virtually parallel.

Another refinement makes an especially small filter possible by providing that the filter is disposed on a diaphragm located between the light source and the lens.

An advantageous feature of the invention provides that a diaphragm is disposed between the light source and the lens. As a result, an advantageous shape can be given to the emerging cone of radiation. It may also be provided that the filter is disposed on the diaphragm.

In this advantageous feature, the illuminated area can be adapted to the field of view of an infrared image sensor, mounted at a variable height, by providing that the diaphragm has a trapezoidal opening.

BRIEF DESCRIPTION OF THE DRAWINGS

Exemplary embodiments of the invention are shown in several figures in the drawing and explained in further detail in the ensuing description. Shown are.

DETAILED DESCRIPTION OF THE EXEMPLARY EMBODIMENTS

Figure 1:
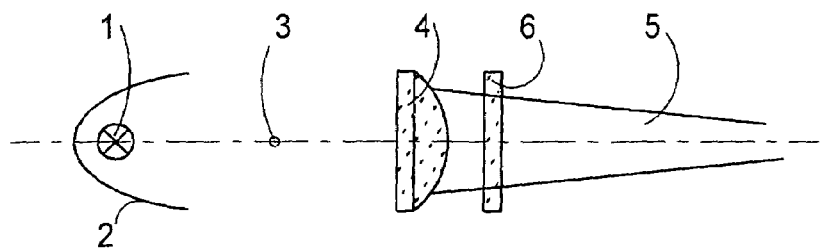
FIG. 1, schematically, the illustration of a first exemplary embodiment.
Figure 2:
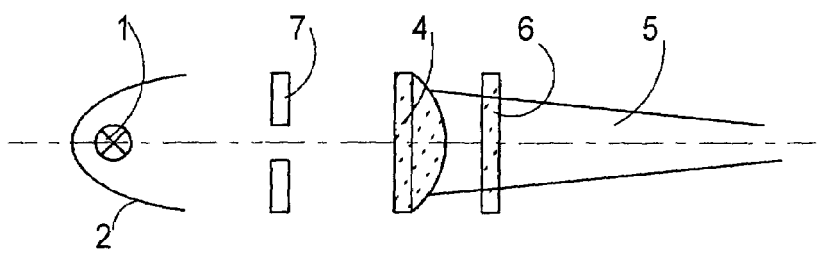
FIG. 2, a second exemplary embodiment.

FIGS. 1 and 2 show the essential parts of a headlight, which is embodied as a so-called projection headlight. A halogen incandescent bulb 1 is located in a reflector 2 in such a way that radiation 5 that is tightly focused by the lens 4 emerges from the headlight. A filter 6 admits radiation in the near-infrared range, while visible light is meant to be suppressed by the filter 6.

Figure 4:
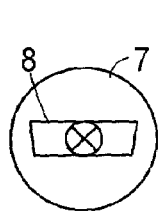
FIG. 4, a different view of the second exemplary embodiment.

In the exemplary embodiment of FIGS. 2 and 4, a diaphragm 7 is located at 3 and has an opening 8 which has the form of a trapezoid, providing a corresponding boundary for illumination of the space ahead of the vehicle that is adapted to the field of view of an infrared image sensor mounted at a variable height.

Figure 3:
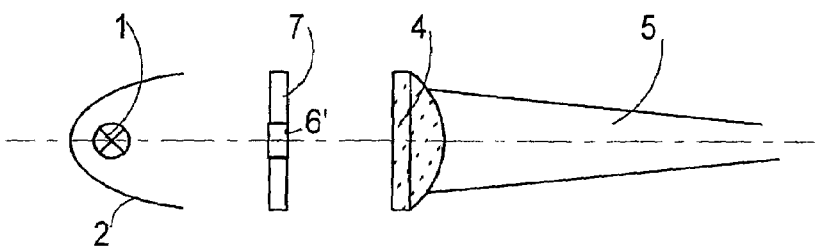
FIG. 3, a third exemplary embodiment of a headlight of the invention.

The exemplary embodiment of FIG. 3 has a filter 6' disposed in the opening in the diaphragm 7. This has the advantage that the filter 6' can be made smaller than the filter 6 (FIG. 2).

Figure 5:
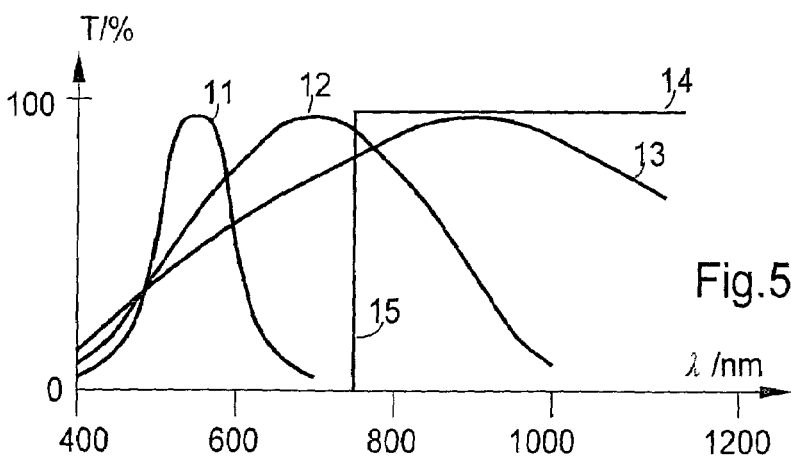
FIG. 5, various characteristic curves for explaining the invention.

FIG. 5 shows various characteristic curves, whose explanation contributes to understanding the invention. Specifically, as a function of the wavelength lambda, relative values for the sensitivity 11 of the human eye, the sensitivity 12 of a conventional image sensor, the spectral distribution 13 of a light from a halogen incandescent bulb, and a filter characteristic curve 14 are shown. Ideally, the filter characteristic curve 14 has an extremely steep edge 15.

The quality of the signal shown on a screen is determined, among other factors, by the intensity of the incandescent bulb, the sensitivity of the image sensor, and the transmission of the filter. Because of the maximum sensitivity of the image sensor for visible radiation, IR headlights are meant to emit an infrared range that as much as possible is near the visible range. However, this is limited by the fact that lights that appear red are prohibited by law on the front of the vehicle. Moreover, filters with a very steep edge 15 are complicated to manufacture and are correspondingly expensive.

Figure 6:
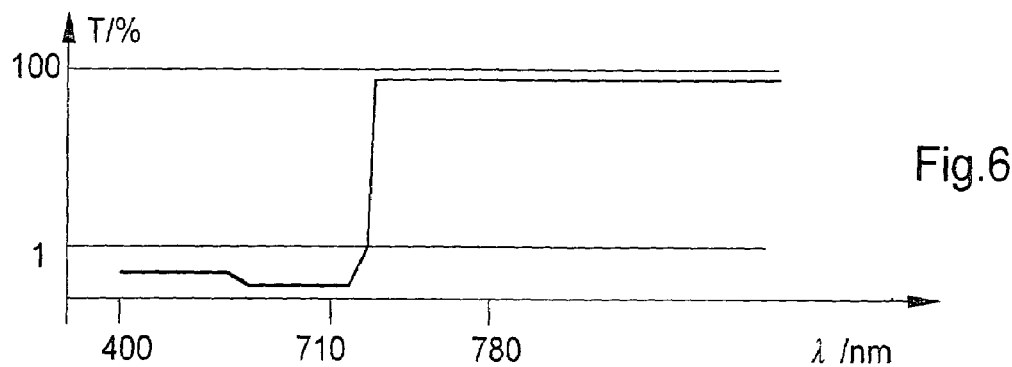
FIG. 6, an exemplary embodiment of a filter characteristic curve.

FIG. 6 shows the characteristic curve of a filter which in the total visible range has a transmission that, although slight, is still perceptible, and that is elevated somewhat in the shorter-wave range.

A filter with this kind of characteristic curve can be realized for instance as an optical interference filter with from 40 to 70 coatings that are applied to a glass or plastic substrate. The coatings may be applied to only one side or maybe distributed over both sides. It is also possible for a plurality of substrates, preferably two, to be used. The transmission for wavelengths between 400 nm and 710 nm amounts to less than 1%. For wavelengths between 780 nm and 1100 nm, the transmission is between 80% and 100%, in each case with transmission directions perpendicular to the surface of the filter. The rise at the edge (transition range) of the filter (transmission of from 10% to 90% of the maximum value) occurs within a range of less than 40 nm.

The claim invention is:

1. A headlight for vehicles that emits light in the near-infrared range and that has both a light source, which projects not only in the infrared range but also in the visible range, and an infrared range-transmissive filter, wherein a transition range of the filter (6) extends from the infrared range into the red spectral range of the visible range, and further spectral components in the visible range are emitted in attenuated form, and having a diaphragm located between the light source and a lens, wherein the filter is disposed in an opening of the diaphragm, wherein the opening is completely framed by the diaphragm.

2. The headlight according to claim 1, wherein the further spectral components and the red component admitted by the filter (6) produce a color impression which is not red.

3. The headlight according to claim 1, wherein the filter is transmissive for the further spectral components.

4. The headlight according to claim 3, wherein the further spectral components and the red component include the visible range.

5. The headlight according to claim 4, wherein the transmission of the filter (6) is greater in the short-wave range of the further spectral components than in their long-wave range.

6. The headlight according to claim 1, wherein the filter (6) is located in front of the headlight.

7. The headlight according to claim 6, wherein the diaphragm (7) has a trapezoidal opening (8).

* * * * *